May 11, 1937.    J. T. GIBSON ET AL    2,080,126
INTERNAL COMBUSTION ENGINE
Filed Oct. 9, 1935    2 Sheets-Sheet 1
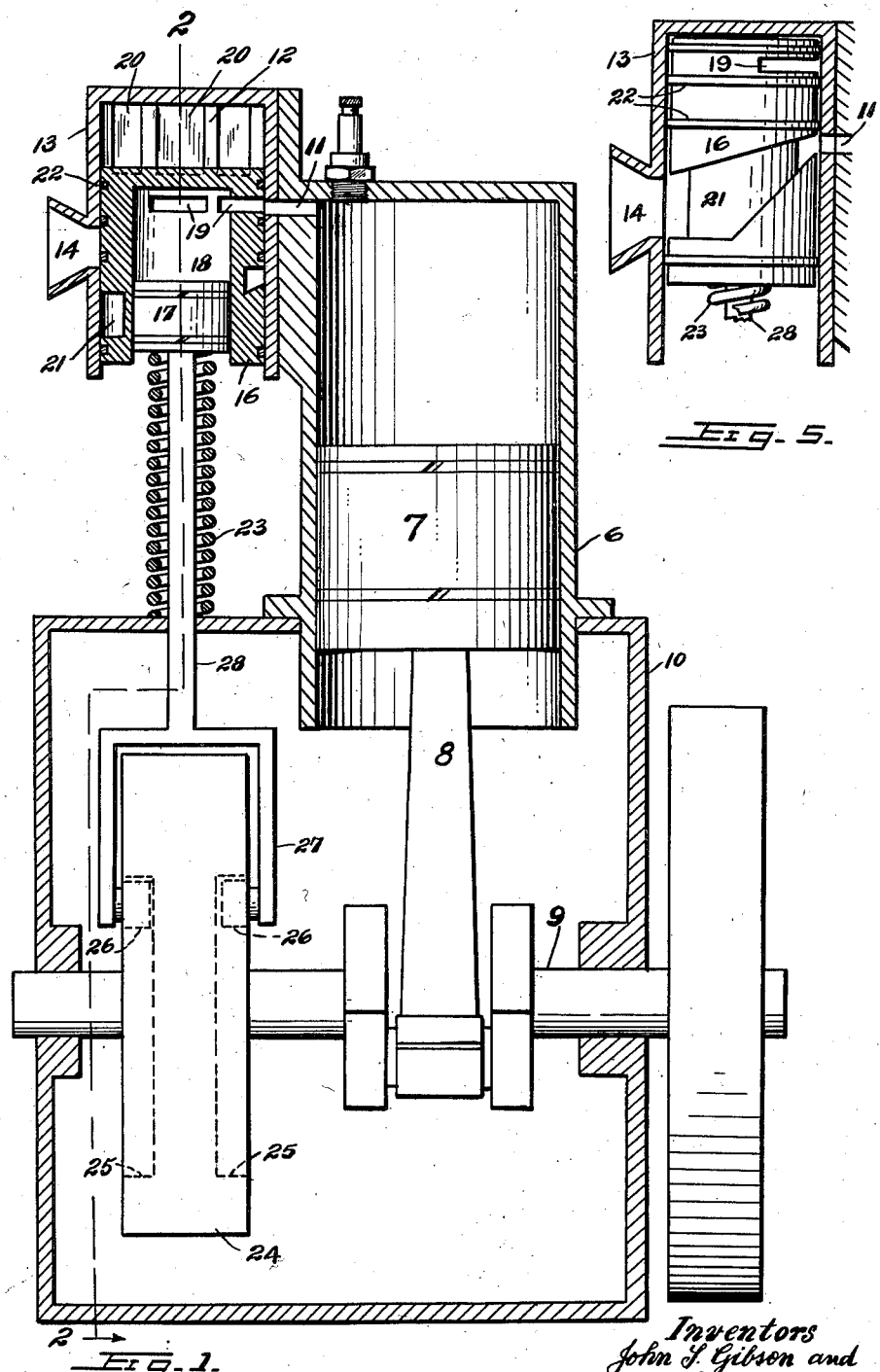
Inventors
John T. Gibson and
Nelson S. Garrett
By Frederick C. Bromley
Attorney

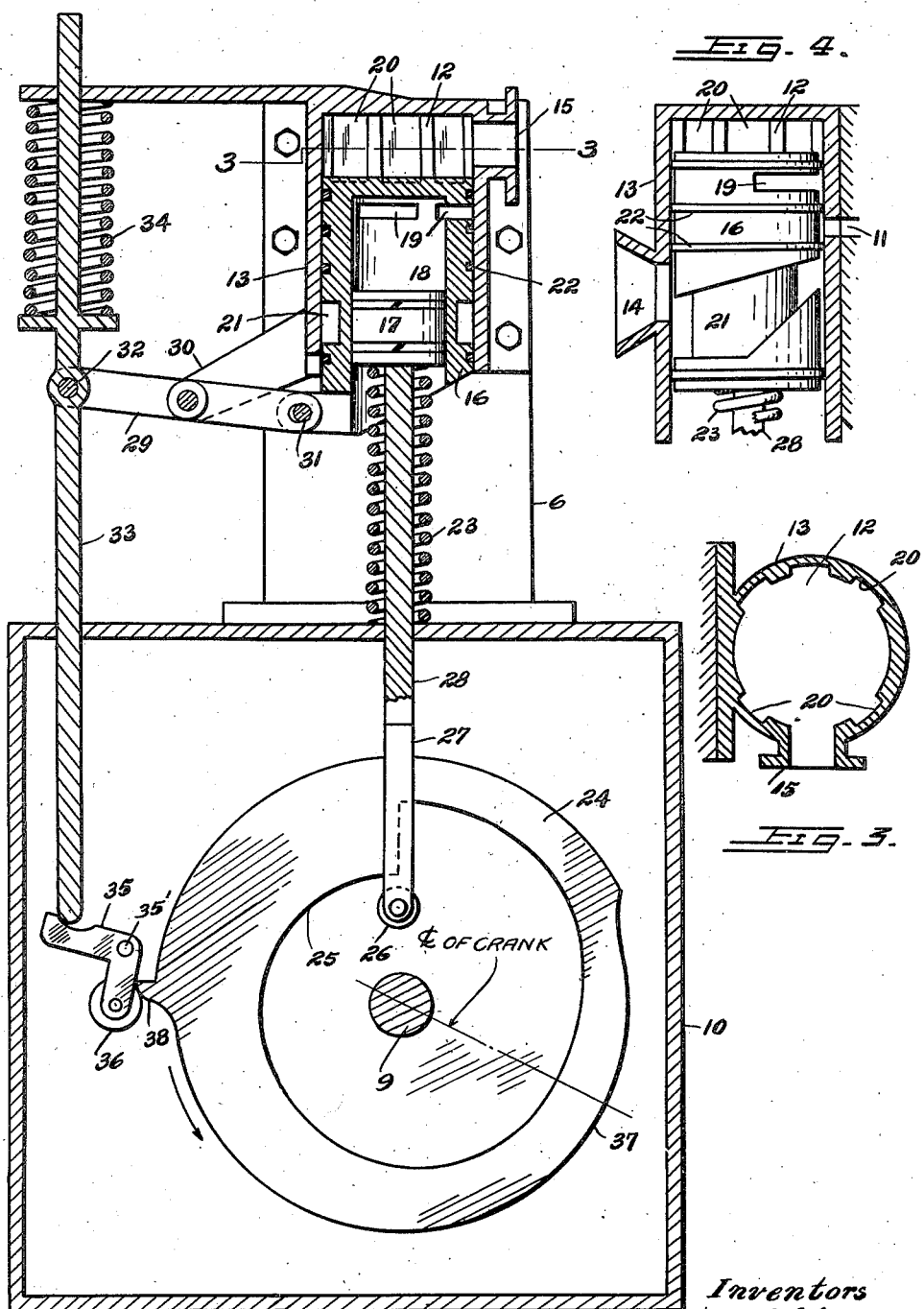

Patented May 11, 1937

2,080,126

UNITED STATES PATENT OFFICE 2,080,126

INTERNAL COMBUSTION ENGINE

John T. Gibson and Nelson F. Garrett, Barrie, Ontario, Canada

Application October 9, 1935, Serial No. 44,140

5 Claims. (Cl. 123—188)

The invention appertains to a two-cycle internal combustion engine having a single port for admitting and exhausting gases. The invention comprehends a main cylinder in which the charge is exploded and a secondary cylinder in which a reciprocable piston operates in conjunction with an encompassing sleeve. The piston and the sleeve are operated in timed relation to the usual reciprocating mechanism of the main cylinder in order to inject a definite measured charge into the main cylinder and to discharge the spent gases therefrom. The said piston is actuated by a spring tensioned by a quick-drop cam and released by it to inject the charge into the main cylinder.

The sleeve is controlled by a cam-actuated spring mechanism to cut off the cylinder port and also to open it to the exhaust outlet.

The object of the invention is to produce a highly efficient reciprocating engine in which a definite quantity of fuel will be fed to the main cylinder for each working stroke. A further object of the invention is to provide a cool running engine in which a conventional water jacket is not requisite by reason of the burned charge having sufficient time to cool before discharge.

A still further object of the invention is to obtain maximum efficiency and power from a two-cycle engine.

A distinct advantage of the invention is that it produces a smooth and quiet running engine of uniform power output at a given speed.

Referring to the accompanying drawings, Figure 1 is a vertical sectional view of the engine.

Figure 2 is a vertical section taken on line 2—2 of Figure 1.

Figure 3 is a cross section on line 3—3 of Figure 2.

Figure 4 is a sectional detail of the secondary cylinder showing the sleeve in the position in which it cuts off the inlet port of the main cylinder.

Figure 5 is a similar detail view showing the sleeve in the exhaust position.

Like numerals of reference indicate corresponding parts in each of the figures throughout the drawings of the invention.

The accompanying drawings are illustrative of the preferred construction of the invention. The reference numeral 6 denotes the power cylinder, or in other words the cylinder in which the mixture is exploded. The reciprocable piston of this cylinder is denoted at 7 and has the usual connecting rod 8 mounted on the crankshaft 9 housed in the crankcase 10.

In carrying out the invention, a port 11 is provided at the head of the cylinder 6, which port serves both for the intake of fuel and also for the exhaust of the spent gases. The port communicates with the interior 12 of a secondary cylinder 13 closed at the top and open at the bottom. The secondary cylinder may be integral with or secured to the main cylinder. The secondary cylinder has an exhaust outlet 14 of a substantially larger area than the port 11 and situated below the same on the diametrically opposite side of the cylinder.

The fuel mixture is admitted into the top portion of the secondary cylinder by means of the intake 15 which is laterally situated, as shown, for convenient connection of a carburetor or equivalent device. This cylinder contains the reciprocable sleeve 16 in which the piston 17 is operably disposed for axial movement. The bore 18 of the sleeve is closed at the top and open at the bottom, and in the vicinity of the top is a plurality of ports 19. One of these ports may be brought into register with the port 11 of the main cylinder by movement of the sleeve and the other of these ports communicate with passages 20 formed in the inner wall of the cylinder 13.

The passages extend axially from the top of the cylinder bore in order to form a communication with the sleeve ports 19 and the cylinder space above the sleeve. This enables the mixture to be drawn into the sleeve bore irrespective of the position of the sleeve. The passages 20 will be best understood from an inspection of Figure 3.

The sleeve has a circumferential exhaust passage 21 below the ports 19 and open to the inner wall of its cylinder. This passage is so disposed that when the sleeve is at the top end of the cylinder the port 11 is brought into communication with the exhaust outlet 14. The passage is gradually enlarged from the port 11 to said outlet so that exhaust gases may expand before being finally discharged.

The sleeve is equipped with sealing rings 22 which are desirably arranged on both sides of the ports 19 and also on both sides of the exhaust passage 21.

The mechanism for operating the piston 17 comprises a compression spring 23 for inwardly urging the piston and means for gradually retracting the piston and suddenly releasing it to inject the charge into the main cylinder. Said means consists of a cam 24 having a quick-drop cam face on each side as at 25. Each cam face engages a roller 26 of a follower 27 forming a part of the rod 28 that extends from the piston. This rod is slidably mounted in suitable manner.

The mechanism for operating the sleeve 16 comprises a rocker 29 fulcrumed on the bracket 30 and having an end pivoted at 31 to the lower end of the sleeve. The other is pivoted at 32 to a slidably mounted rod 33. A compression spring 34 urges the rod downwardly in order to force the sleeve upwardly. The lower end of the rod is engaged by a rocker 35 pivoted at 35' and having a roller 36 that rides on the periphery of the cam 24. Half of the periphery of this cam is reduced to provide a cam face 37 which terminates in an abrupt shoulder 38. The cam is mounted on and driven by the crankshaft.

In the operation of the engine, as the main piston 7 approaches the end of its up stroke, the other piston 17 is released by the cam faces 25 and urged by the spring 23 to inject a charge from the interior of the sleeve 18 through the port 11 into the main cylinder 6. The sleeve 16 is held by its actuating mechanism so that the charge can pass into the main cylinder, the charge being previously drawn into the sleeve bore by the action of the cam faces 25 in the turning of the crankshaft. Figure 1 depicts the sleeve in the position in which the charge is injected. It will be observed that in this view the piston 7 in the power cylinder is substantially in its dead centre position with the combustion chamber substantially at its minimum volume. A port 19 of the sleeve is in register with the port 11 of the power cylinder and the piston 17 of the sleeve is retracted so that upon release it will suddenly inject the charge through the passages leading to the power cylinder.

It will be gathered that the charge is thus injected into the power cylinder before the piston 7 has reached the end of its up stroke. Following the injection of the charge the sleeve is moved upwardly by the movement of the cam 24 to the position shown in Figure 4, in which the port 11 is cut off to seal the charge in the power cylinder. The ultimate up movement of the main piston further compresses the charge whereupon it is fired and the piston is driven downwardly on its working stroke, the sleeve maintaining the port 11 in closed condition during the descent of the main piston. In the upward movement of the main piston following the working stroke, the sleeve is shifted upwardly to the position shown in Figure 5 in order that its exhaust passage 21 may bring the port 11 in communication with the exhaust outlet 14 for exhausting spent gases. The movement of the sleeve to the cut-off position, shown in Figure 4, following the injection of the charge, establishes communication between certain of the sleeve ports 19 and the passage 20 of the secondary cylinder 13 in order that the piston 17 may draw in another charge as it is retracted by the cam faces 25. This established communication is maintained during the exhausting of the gases from the power cylinder as shown by Figure 5. When the piston 7 of the power cylinder again approaches the end of its up stroke, this fresh charge is injected as above recounted. During each turn of the crankshaft a recurrence of the operations above recounted ensues.

With regard to the control of the engine, the capacity of the bore of the sleeve is designed to take care of the maximum load imposed on the engine, or in other words its greatest output. The fuel may be injected or pumped to the intake 15 and by reducing the quantity delivered, the speed or output of the engine is cut down as will be understood by those skilled in the art. In the use of a carburetor, a throttle will of course be provided to control the quantity of fuel to be delivered to the injection chamber.

What we claim is:—

1. The combination with a firing cylinder of an internal combustion reciprocating engine, of a secondary cylinder having a port communicating with the head end of the firing cylinder, a sleeve reciprocably disposed in said secondary cylinder having a closed top and an open bottom, said secondary cylinder and the sleeve having means to admit a mixture to said port, means for shifting the sleeve to cut off the port, and a piston operable in the sleeve for drawing into said sleeve the mixture and ejecting it through said port into the firing chamber.

2. The combination with a firing cylinder of an internal combustion reciprocating engine, of a secondary cylinder having a port communicating with the cylinder, a sleeve reciprocably disposed in said secondary cylinder having a chamber for registering with said port, said sleeve having means for admitting a mixture into its chamber, and a piston operable in the chamber for drawing in the mixture and ejecting it through the port into the firing chamber.

3. The combination with a firing cylinder of an internal combustion reciprocating engine, of a secondary cylinder having a port communicating with the head end of the firing cylinder, means for admitting a mixture into said secondary cylinder, a sleeve reciprocably disposed in the secondary cylinder having a closed top and an open bottom, said sleeve having ports forming a communication between its interior and the secondary cylinder and a port communicating with the said port of the firing cylinder, means for shifting the sleeve to cut off its communication with the firing cylinder, and a piston operable in the sleeve for injecting the mixture through said port leading to the firing cylinder.

4. The combination with a firing cylinder of an internal combustion reciprocating engine, of a secondary cylinder disposed alongside said firing cylinder and having a closed top and an open bottom, the top of the secondary cylinder being situated above the firing cylinder and having a transverse port communicating with the bore of the firing cylinder, an intake for mixture disposed at the top portion of the secondary cylinder, vertical passages formed in the interior of the secondary cylinder and terminating short of the transverse port, a sleeve reciprocably disposed in the secondary cylinder having a closed top and an open bottom, said sleeve having ports in its side walls establishing communication with the said vertical passages and also with said transverse port, and a piston operable in the sleeve for injecting the mixture through said transverse port into the firing cylinder.

5. In a fuel injector for an internal combustion engine, a port-controlling sleeve, a rocker fulcrumed intermediate of its length and having an end connected to said sleeve, a rod extending parallel to the sleeve and pivoted to the other end of the rocker, a compression spring urging the rod endwise, a pivotally mounted follower engaged with an end of the rod to urge it against the pressure of the spring, and a rotary cam engaged with the follower.

JOHN T. GIBSON.
NELSON F. GARRETT.